United States Patent
Deicke et al.

(10) Patent No.: US 7,712,965 B2
(45) Date of Patent: May 11, 2010

(54) PISTON PIN BUSHING

(75) Inventors: Klaus Deicke, Untereisesheim (DE);
Werner Schubert, Wiesloch (DE); Theo Buschenhenke, Ostrhauderfehn (DE);
Reimond Rathje, Papenburg (DE);
Heinbert Langner,
Rheda-Wiedenbrueck (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 933 days.

(21) Appl. No.: 10/590,141

(22) PCT Filed: Mar. 16, 2005

(86) PCT No.: PCT/EP2005/002794
§ 371 (c)(1),
(2), (4) Date: Aug. 21, 2006

(87) PCT Pub. No.: WO2005/090621
PCT Pub. Date: Sep. 29, 2005

(65) Prior Publication Data
US 2007/0175417 A1    Aug. 2, 2007

(30) Foreign Application Priority Data
Mar. 19, 2004    (DE) ................ 10 2004 013 548

(51) Int. Cl.
*F16J 1/16*    (2006.01)
*C22C 9/04*    (2006.01)

(52) U.S. Cl. .............. 384/276; 384/912; 420/479; 420/480

(58) Field of Classification Search ........... 384/276, 384/912; 420/479, 480
See application file for complete search history.

(56) References Cited

FOREIGN PATENT DOCUMENTS

| DE | 1 051 992 | 3/1959 |
|---|---|---|
| DE | 1 558 817 | 4/1970 |
| DE | 2 159 482 | 6/1973 |
| DE | 40 35 264 | 5/1992 |
| DE | 197 28 777 | 3/2001 |
| DE | 198 01 074 | 1/2002 |
| DE | 101 44 126 | 1/2003 |
| EP | 0 681 114 | 11/1995 |
| EP | 1 158 062 | 11/2001 |
| WO | WO 00/00761 | 1/2000 |

*Primary Examiner*—William C Joyce
(74) *Attorney, Agent, or Firm*—Paul Vincent

(57) ABSTRACT

A piston pin bushing consisting of a brass alloy containing between 30 and 32.2 wt. % zinc, between 1.8 and 2.2 wt. % aluminium, between 1.8 and 2.2 wt. % manganese, between 1.4 an 2.2 wt. % nickel and between 1.4 and 2.0 wt. % iron, in addition to optional contaminant-related constituents with a respective maximum content of 0.2 wt. % and a maximum total content of 1 wt. %, the remaining percentage consisting of copper. The bushing is cut in the form of a longitudinal section from a continuously cast pipe, whose exterior has been previously machined and can be used without being subjected to a forging process following the cutting operation.

6 Claims, 1 Drawing Sheet

PISTON PIN BUSHING

This application is the national stage of PCT/EP2005/002794 filed on Mar. 16, 2005 and also claims Paris Convention priority of DE 10 2004 013 548.7 filed on Mar. 19, 2004.

BACKGROUND OF THE INVENTION

The present invention concerns a piston pin bushing made from a copper zinc alloy.

Piston pin bushings have been produced up to now i.a. using forgeable copper zinc alloys, in particular CuZn31Si. The forgeable alloy is thereby initially continuously cast into a tubular section. This tubular section is then forged, i.e. pulled through a drawing die, thereby roughly determining the outer and inner shape and also influencing the structure through forging. This is optionally followed by thermal treatment (re-crystallization annealing). Bushings are cut out from the section obtained in this manner, the outer sides of which are subjected to machining. The bushings obtained in this manner are pressed into a piston. The opening is then cut on a lathe, i.e. while rotating the workpiece, in order to provide the opening with a defined structure and configuration relative to the piston (so-called shaped bore) in the predetermined orientation of the bushing relative to the piston.

Departing therefrom, it is the object of the present invention to produce a piston bushing in a more economical fashion.

SUMMARY OF THE INVENTION

This object is achieved in accordance with the invention by a piston pin bushing comprising the features of the independent claim.

Forging of the piston pin bushing material after continuous casting is deliberately omitted. This can be subsequently detected in the structure of the piston pin bushing.

Piston pin bushings are subjected to great wear due to temperature, pressure and impact load caused by ignition pressure. It has been assumed for a long time that forging was absolutely necessary in order to obtain this large strain resistance by changing the cast structure into a forgeable structure. In accordance with the invention, it has been determined that forging can be omitted with use of the claimed alloy, thereby still obtaining excellent results, which are even better than those of conventional forgeable CuZn31Si alloys.

Preferred embodiments of the inventive piston pin bushing can be extracted from the dependent claims.

The claimed invention is also directed to a method of producing a piston pin bushing comprising the features of the claims. The piston pin bushing obtained in this manner can be pressed into the piston pin opening of the piston without further cutting. When it has been pressed in, the shaped bore is provided.

DESCRIPTION OF THE PREFERRED EMBODIMENT

Figure 1:
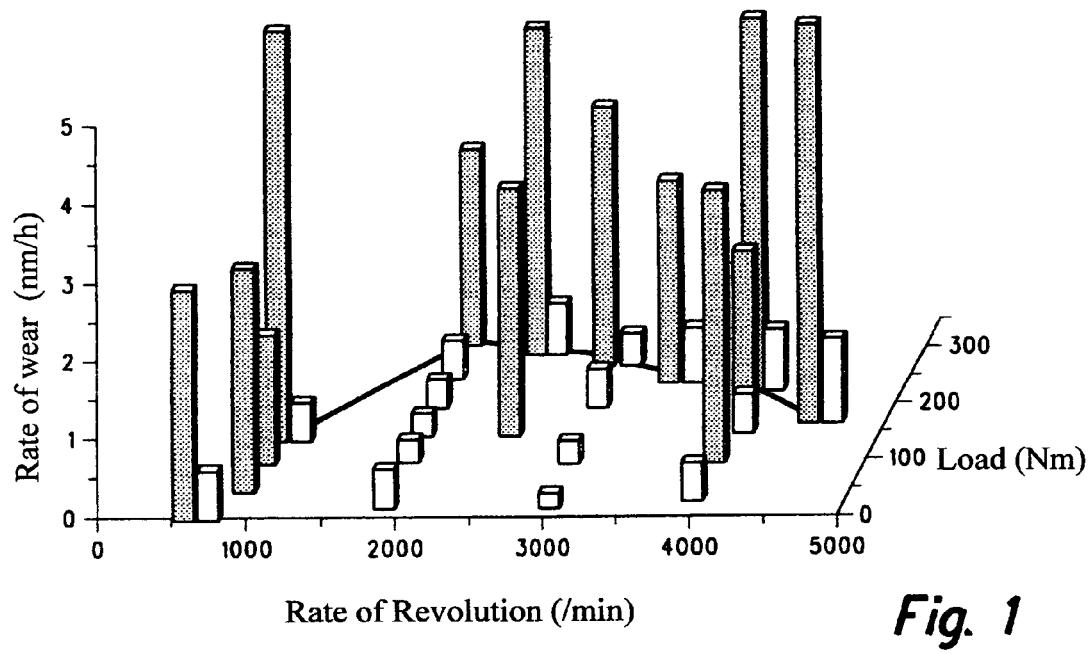
FIGS. 1 and 2 show the results of comparative measurements of the wear rate.

Comparative measurements were performed, wherein a series piston pin bushings of a forgeable CuZn31Si alloy and an inventive piston pin bushing of a CuZn30Al2NiMnFe alloy were compared in an engine having a nominal power of 96 kW at 4000 revolutions/min. The wear rate in nm/h was determined, i.e. the thermally higher loaded piston pin bushing of the piston (compared to the coolant channel inlet), averaged over an area of 12 mm×22 mm in the main load region (the apex region facing the bottom), was examined with respect to wear. The measurement results are shown in the diagram of FIG. 1. One can see the wear rate in dependence on the rotational speed and the load.

Figure 2:
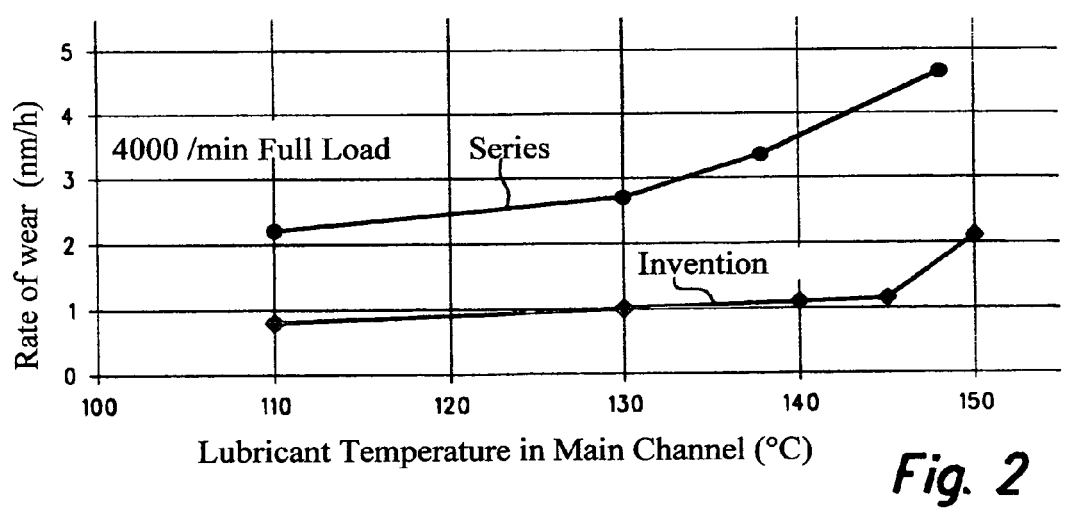

FIG. 2 shows the result of the determined wear rate of the two bushings at full load (4000 revs/min) in dependence on the lubricant temperature in the main channel of the engine.

The figure shows that the inventive piston pin bushing is by far superior to the series bushing of a forgeable CuZn31Si alloy although it has not been forged during production.

We claim:

1. A piston pin bushing comprising:
a brass alloy having between 30 and 32.2 weight % of zinc, 1.8 to 2.2 weight % of aluminium, 1.8 to 2.2 weight % of manganese, 1.4 to 2.2 weight % of nickel, 1.4 to 2.0 weight % of iron, contaminant-related constituents with a respective maximum content of 0.2 weight % and a maximum total content of 1 weight %, the rest copper, wherein the piston pin bushing is cut as a longitudinal section from a continuously cast pipe whose exterior has been previously machined, and is used without being subjected to a forging process following cutting.

2. The piston pin bushing of claim 1, wherein said brass alloy comprises between 1.8 and 2.2 weight % of nickel.

3. The piston pin bushing of claim 1, wherein said brass alloy comprises between 1.6 and 2.0 weight % of iron.

4. The piston pin bushing of claim 1, wherein the bushing has an outer diameter of between 20 and 50 mm.

5. The piston pin bushing of claim 1, wherein the bushing has a wall thickness of between 1 and 4 mm.

6. A method for producing a piston pin bushing, the method comprising the steps of:
a) preparing a brass alloy having between 30 and 32.2 weight % of zinc, 1.8 to 2.2 weight % of aluminium, 1.8 to 2.2 weight % of manganese, 1.4 to 2.2 weight % of nickel, 1.4 to 2.0 weight % of iron, contaminant-related constituents with a respective maximum content of 0.2 weight % and a maximum total content of 1 weight %, and the rest copper;
b) continuously casting the brass alloy to form a tubular body;
c) machining the exterior of the tubular body, and
d) cutting a longitudinal section from the tubular body, without forging following cutting, to form the piston pin bushing.

* * * * *